(12) United States Patent
Mahnken et al.

(10) Patent No.: US 7,458,618 B2
(45) Date of Patent: Dec. 2, 2008

(54) FIXED FLANGE SPRAY DEFLECTOR

(75) Inventors: Glenn Mahnken, Sharon, MA (US);
Paul H. Dobson, Milton, MA (US)

(73) Assignee: FM Global Technologies, Johnston, RI (US)

( * ) Notice: Subject to any disclaimer, the term of this patent is extended or adjusted under 35 U.S.C. 154(b) by 555 days.

(21) Appl. No.: 11/036,129

(22) Filed: Jan. 18, 2005

(65) Prior Publication Data
US 2006/0157592 A1   Jul. 20, 2006

(51) Int. Cl.
*F16L 23/02* (2006.01)
*B05B 1/26* (2006.01)

(52) U.S. Cl. .................. 285/405; 285/13; 285/363; 285/368; 239/504; 239/518; 239/521

(58) Field of Classification Search .............. 285/13, 285/45, 283, 363, 364, 368, 405, 406, 413, 285/414; 239/499, 504, 518, 521, 548, 558, 239/559, 567
See application file for complete search history.

(56) References Cited

U.S. PATENT DOCUMENTS

| | | | |
|---|---|---|---|
| 403,482 A | 5/1889 | O'Beirne | |
| 949,520 A * | 2/1910 | Choate | 239/276 |
| 968,759 A | 8/1910 | Fogg | |
| 1,070,667 A * | 8/1913 | Clark | 285/413 |
| 1,723,296 A * | 8/1929 | Nicholson | 239/504 |
| 2,127,883 A * | 8/1938 | Norton | 239/497 |
| 2,464,255 A * | 3/1949 | Mustee | 239/407 |
| 2,634,812 A * | 4/1953 | Allemang | 166/81.1 |
| 2,674,087 A * | 4/1954 | Russell | 239/430 |
| 2,696,517 A | 12/1954 | Bird | |
| 2,699,960 A * | 1/1955 | Callery et al. | 285/13 |
| 3,113,790 A | 12/1963 | Matthiessen | |
| 3,850,373 A * | 11/1974 | Grolitsch | 239/499 |
| 4,211,439 A * | 7/1980 | Moldestad | 285/27 |
| 4,216,980 A | 8/1980 | Shreve | |
| 4,320,910 A | 3/1982 | Leasher et al. | |
| 4,366,970 A * | 1/1983 | Hogan, Jr. | 285/45 |
| 4,403,794 A | 9/1983 | Curran et al. | |
| 4,441,694 A | 4/1984 | Curran et al. | |
| 4,483,554 A | 11/1984 | Ernst | |
| 4,484,771 A * | 11/1984 | Schulz | 285/368 |
| 4,583,941 A * | 4/1986 | Elperin et al. | 431/347 |
| 4,854,611 A * | 8/1989 | Press | 285/3 |
| 5,312,137 A | 5/1994 | Nee | |
| 5,470,110 A * | 11/1995 | Hupe | 285/13 |
| 5,718,265 A | 2/1998 | Elsdon et al. | |
| 5,957,503 A * | 9/1999 | Brown | 285/13 |

(Continued)

OTHER PUBLICATIONS

The Ramco Safety Shield Manual, pp. 1-29, Eleventh Edition, Ramco Manufacturing Company, Inc., Jan. 1999.

*Primary Examiner*—James M Hewitt
(74) *Attorney, Agent, or Firm*—Merek, Blackmon & Voorhees, LLC (57) ABSTRACT

A spray deflecting joint of fluid conveying structures has a spray obstructing structure lying in the path of any fluid that might spray from the joint in any direction within a range of directions, wherein the spray obstructing structure is permanently attached to one of the fluid conveying structures, is shaped to reduce the momentum of liquid sprays and/or has a surface treatment to reduce the momentum of liquid sprays.

29 Claims, 5 Drawing Sheets

U.S. PATENT DOCUMENTS 6,082,639 A * 7/2000 Pentz et al. ................ 239/655
6,231,052 B1 5/2001 Forlander
6,758,500 B2 * 7/2004 Lehnhardt .................. 285/365
6,799,639 B2 * 10/2004 Sato et al. .................... 169/37
2003/0184083 A1 10/2003 Linam et al.

* cited by examiner

FIXED FLANGE SPRAY DEFLECTOR

BACKGROUND OF THE INVENTION

The present invention relates to protection from sprays of pressurized fluids and, more particularly, to structures for preventing injury and/or property damage from sprays of pressurized fluids at joints in fluid conveying structures.

Sprays of pressurized fluids from improperly secured or sealed joints, such as pipe joints having improperly bolted and/or gasketed flanges, can shoot long distances from the point of release. Such sprays can cause injury to personnel, damage to equipment, especially in the case of spraying liquids, and fires, in the case of flammable fluids. The spray trajectory can reach several meters out from an improperly connected or sealed joint, thereby striking personnel, and/or potential ignition sources if the fluid is combustible, or spreading corrosive liquids over a wide range, in the case of corrosive liquids.

Removable deflectors, also called "spray shields", are known for protection against sprays of pressurized fluids from pipe joints. However, these removable deflectors have the disadvantages that they might not be properly installed, might be omitted entirely, or might not be replaced after being removed for maintenance or other purposes.

SUMMARY OF THE INVENTION

By the present invention, a structure for obstructing and weakening sprays from a faulty joint of fluid conveying structures is permanently attached at the joint. In the case of, for example, a flanged pipe connection, a deflector is permanently attached to one of the flanges or to one of the pipes near the flange so as to extend in the path of potential sprays after a joint is made. As a result, the structure deflects the sprays from a direction extending away from the fluid conduits to either a lateral direction close to the fluid conduits or downward, in either case so as to reduce the likelihood and extent of harm from the sprays. Thus, the spray deflecting structure lies in the path of any fluid that might spray from the joint in any direction within a range of directions. In addition to deflecting the sprays, the structure also causes a loss of momentum of the liquid, thereby reducing the reach of the spray size. As a result of the loss of momentum, some or all of the escaping liquid will leave the joint area as a leak flowing down from the area without momentum rather than as a powerful spray. The spray deflecting structure is sufficiently open to enable the fluid conduits to be completely removed from one another.

The structure is not removable in the normal course of assembly, disassembly or maintenance of the fluid conduits or joint therebetween. For example, the structure is welded, such as spot welded, or riveted to the flange or conduit as opposed to being attached by screw threads, threaded fasteners or other arrangements which can be undone by hand or by tools in a manner that is not significantly more difficult or time-consuming than disassembling the joint between the fluid conduits. The structure of the present invention prevents the structure from being reattached in generally the same manner that it was removed. Although a welded or riveted deflector could be cut away with a cutting torch, and rivets might be able to be severed with a chisel, such possibilities do not mean that deflectors according to the present invention are not "permanently fixed", as that expression is used in the specification and claims herein.

In some embodiments, the shape of the structure is designed to enhance the reduction of the momentum of the sprays. Furthermore, additional momentum reducing features can be provided on the structure.

DETAILED DESCRIPTION OF THE PREFERRED EMBODIMENTS

Figure 1:
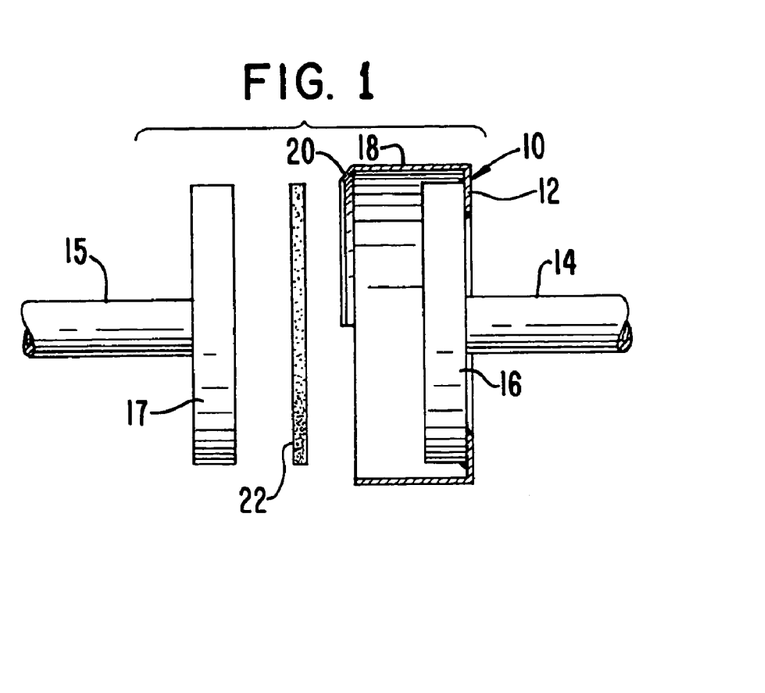
FIG. 1 is a cross section of a first embodiment of the fixed spray deflector according to the present invention on a pipe before the pipe is joined with another pipe.
Figure 2:
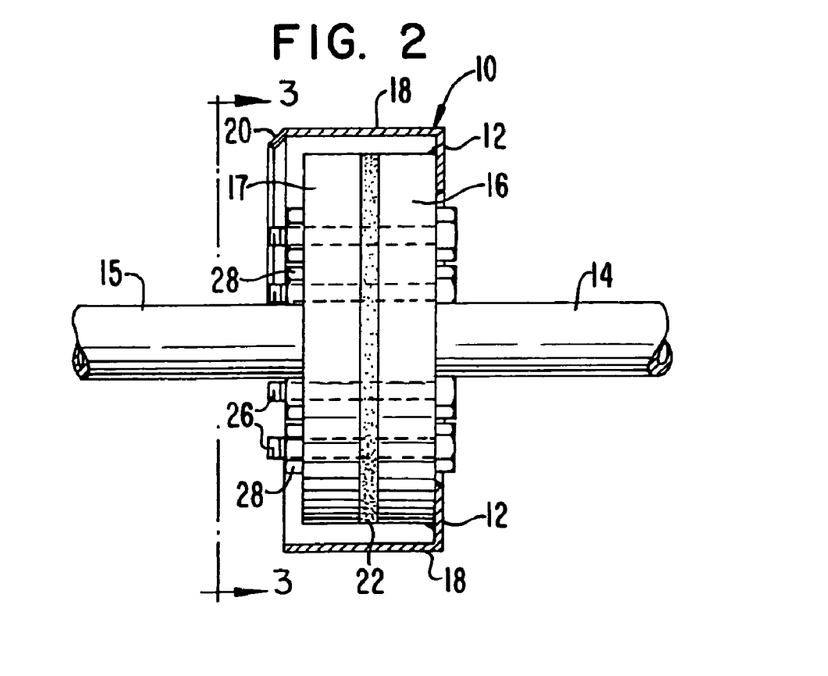
FIG. 2 is a cross-section of the fixed spray deflector of FIG. 1 after the joint has been made.
Figure 3:
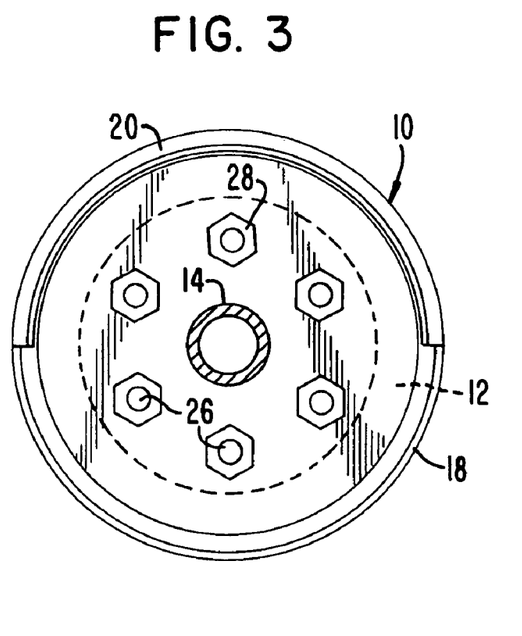
FIG. 3 is a cross-section taken along the line 3-3 in FIG. 2.
Figure 4:
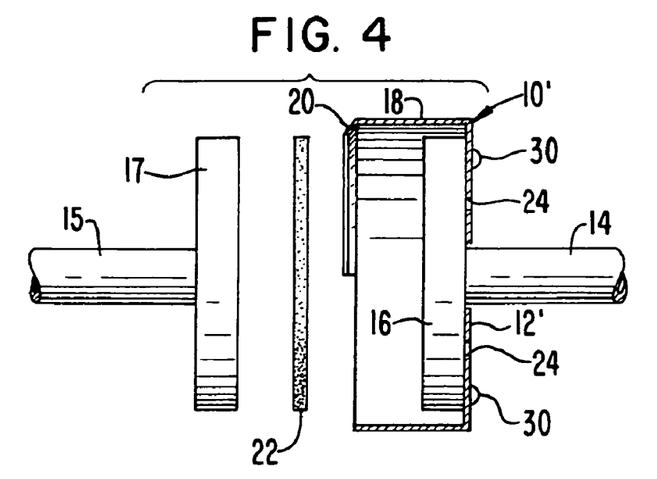
FIG. 4 is a cross section of a second embodiment of the fixed spray deflector according to the present invention on a pipe before the pipe is joined with another pipe.
Figure 5:
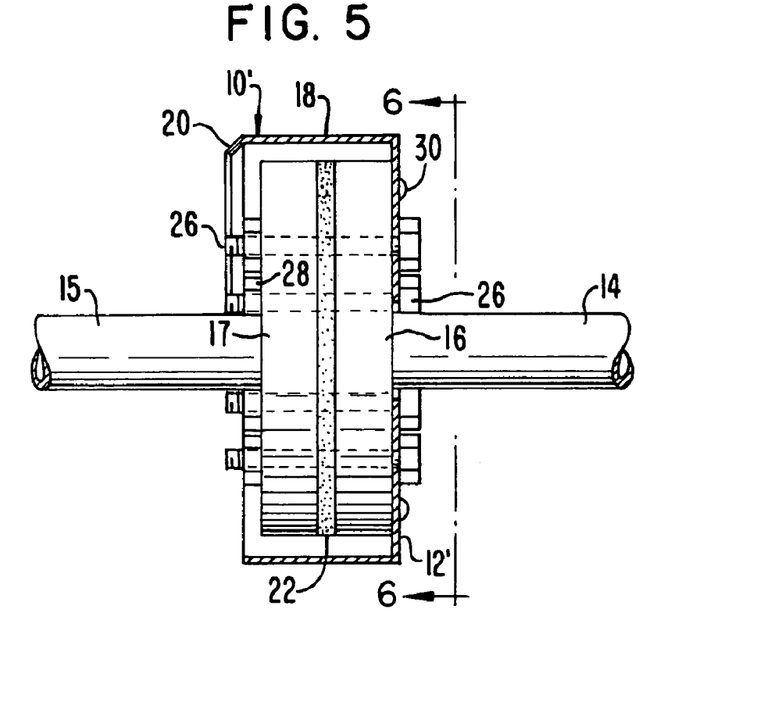
FIG. 5 is a cross-section of the fixed spray deflector of FIG. 4 after the joint has been made.
Figure 6:
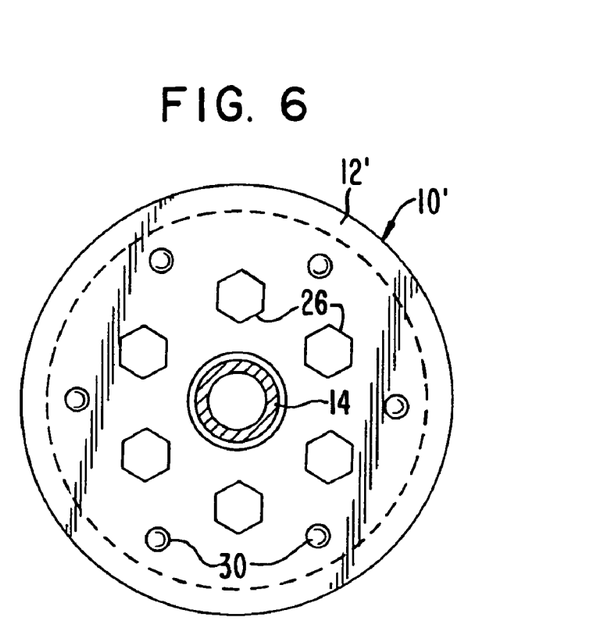
FIG. 6 is a cross-section taken along the line 6-6 in FIG. 5.

As can be seen from FIGS. 1-3, the fixed deflector according to the present invention, which is designated generally by the reference 10, comprises a first portion 12 which is attached to a pipe 14, or other fluid conduit or fluid conveying structure, at or near an end of the pipe that is to be joined with another pipe 15, or other fluid conduit or fluid conveying structure. The pipes 14, 15 typically have flanges 16, 17, respectively, or other formations by which the pipes are joined to one another. The fixed spray deflector 10 has a second portion 18 that extends beyond the end of the first pipe 14 and beyond the plane defined by the joint between the pipes 14 and 15 in a direction normal to the plane. In some embodiments, the fixed spray deflector 10 further has a lip 20 on an edge of the second portion 18 that is remote from the first portion 12, the 20 lip being arcuate, angled obliquely toward the axis of the pipes 14 and 15, and extending along approximately the top half of the second portion 18 of the deflector. The angle of the lip 20 directs the spray back toward the pipe 15. It is preferable to omit the lip 20 from the bottom half of the second portion 18 in most cases so that the spray is not directed upward toward personnel, equipment and ignition sources. However, in some cases, the pipe 14 having the deflector 10 might be so located relative to personnel, equipment, ignition sources, and other things to be protected from sprays that a portion of the lip 20 is omitted that will prevent the sprays from being directed downward, from being directed to one side or the other, or from being directed in some other radial direction' from the joint. In some arrangements, it may be preferable to omit the lip 20 entirely, so that the spray is directed parallel to the length of the pipe 15.

The spray deflector 10 is permanently fixed to the pipe 14, such as to the flange 16 of the pipe, by welding, including spot welding, by rivets, or by some other permanent form of attachment. In the embodiment of FIGS. 1-3, the first portion 12 of the fixed deflector 10 is in the shape of a ring that is secured to a side of the flange 16 spaced from the end of the pipe 14, and the first portion 12 terminates at a radius from the center line of the fluid conduit that lies radially outside bolt holes provided through the flange 16 to enable connection of the flange to the flange 17 on the second pipe 15. As can be appreciated from FIG. 2, after the pipe connection is made, typically with the use of a gasket 22, the fixed deflector 10 lies in the path of any fluid sprays that might issue from the joint in the case of a failure in the securing or sealing of the joint.

The flanges 16 and 17 define between them an interface that defines a perimeter and, in the illustrated embodiments, extends perpendicular to the longitudinal axis of the pipes 14 and 15. The second portion 18 lies outside the interface, in alignment with the interface and across the interface. In the embodiment of FIGS. 1-3, the first and second portions 12 and 18 extend around the entire perimeter of the interface, and the lip 20 extends around approximately half of the perimeter.

In a second embodiment of the present invention, as can be seen from FIGS. 3-6, the various parts are the same as in the first embodiment except that the first part 12' of the fixed deflector 10' extends radially inward beyond the ring of bolt holes through the flange 16. As a result, holes 24 are provided in the first portion 12' of the deflector 10' in alignment with the bolt holes in the flange 16 so as to allow bolts 26 to extend therethrough and cooperate with nuts 28. It is to be noted that the fixed deflector 10' is permanently attached to the flange 12' by fasteners designed not to be removed, such as rivets 30. The deflector 10' can alternatively be permanently attached by welding or other permanent arrangement. Of course, when the bolts 26 and nuts 28 are secured to make the joint, they further prevent the deflector 10' from separating from the flange 16.

Figure 7:
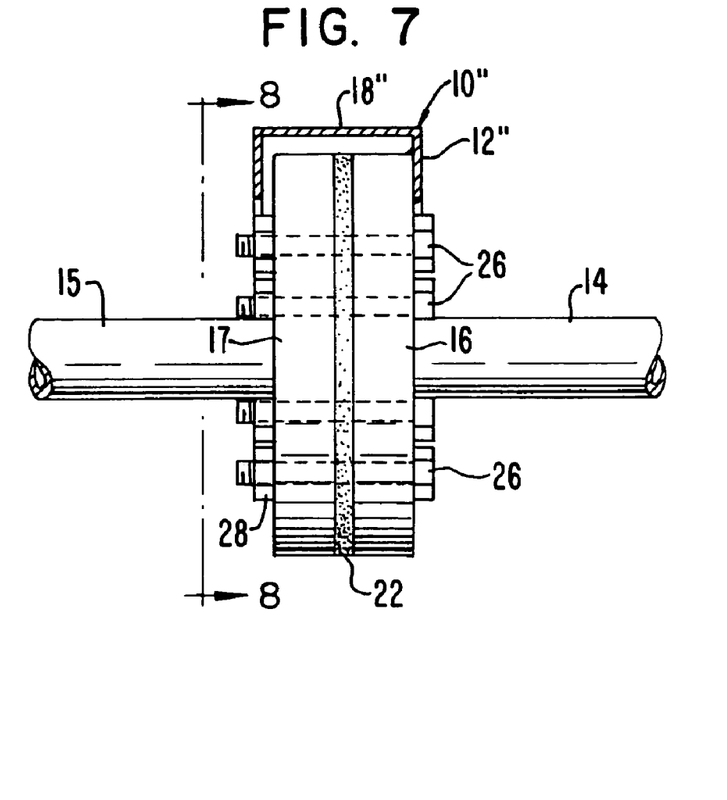
FIG. 7 is a cross section of a third embodiment of the fixed spray deflector according to the present invention on a pipe joint.
Figure 8:
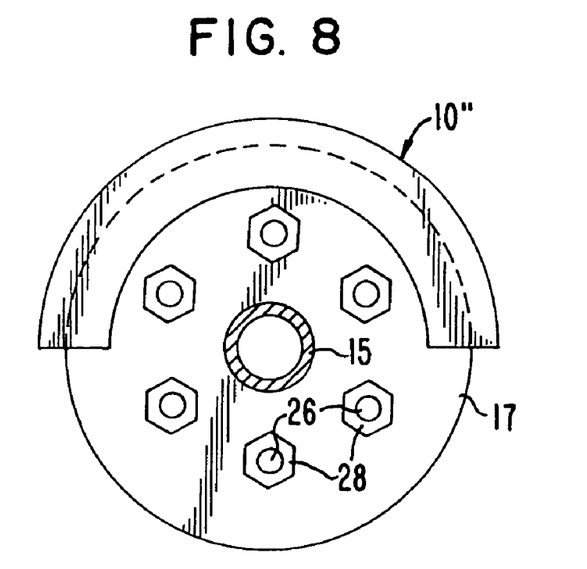
FIG. 8 is a cross section taken along the line 8-8 in FIG.7.

In a third embodiment of the invention, as can be appreciated from FIGS. 7 and 8, the deflector 10" extends circumferentially around only about a half of the perimeter of the interface of the pipes 14 and 15. A first portion 12" of the deflector 10" extends radially inward to an arc lying radially outside the bolts 26. A second portion 18" is like the second portion 18 of the first embodiment except that the second portion 18" extends around only about half of the perimeter of the interface. In addition, the deflector 10" has a third portion 20" extending radially inward from the second portion 18" to an arc lying radially outside the bolts 26, generally in the same manner as the first portion 12".

The third embodiment has the effect of directing sprays away from the side of the joint covered by the deflector 10", in a direction substantially perpendicular to the axis of the pipes 14, 15. As illustrated, the third embodiment directs sprays downward. However, as with the lip 20 of the other embodiments, when a portion of the lip is omitted, the deflector 10" can be installed so as to direct sprays upward, to one side or the other, or in some other direction radial to the joint. As with the other embodiments, the deflector 10" can be attached by welding, rivets, or other permanent arrangement.

Figure 9:
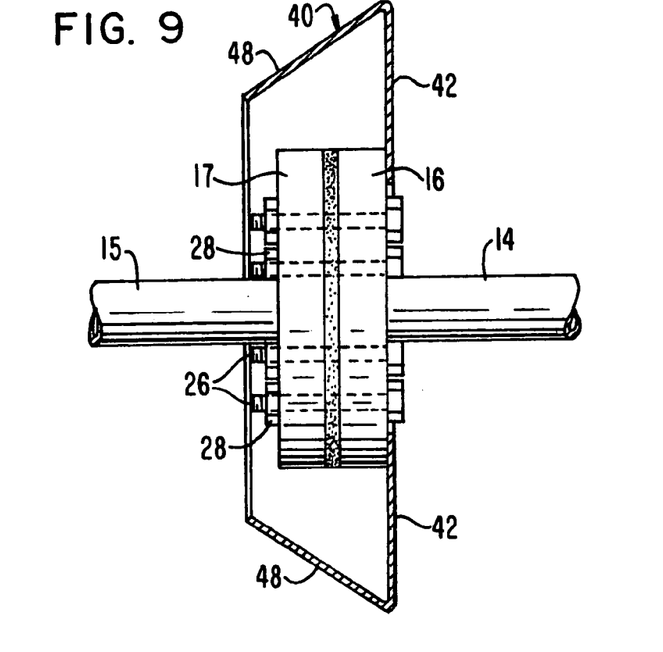
FIG. 9 is a cross section of a fourth embodiment of the fixed spray deflector according to the present invention on a pipe joint.

As can be seen from FIG. 9, the fixed deflector according to the present invention, which is here designated generally by the reference numeral 40, can be shaped to enhance the reduction in the momentum of the sprays. The deflector 40 is like the deflector 10 of FIGS. 1 and 2, except that its second portion 48 extends from its first portion 42 at an acute angle rather than at a substantially right angle and there is no lip like the lip 20. The acute angle can be, for example, about 45 degrees. Any sprays escaping radially from the joint strike the upper portion 48 and, since the upper portion is oriented at an acute angle to radii from the joint, the upper portion deflects the sprays toward the first portion 42, which the sprays also strike. Each strike removes momentum from the sprays. In addition, the liquid of the sprays forms a pool in the vertex of the angle between the second portion 48 and the first portion 42, the pool further reducing the momentum of sprays striking the pool. Although the shaping of the deflector to enhance the reduction in spray momentum has been described in connection with a structure otherwise similar to the emdodiments of FIGS. 1 and 2, such shaping can be used with the other illustrated embodiments, as well as unillustrated embodiments. In general, the features of any of the embodiments herein can be used with any other embodiment of the invention. Furthermore, other shapes that reduce the momentum of the sprays, particularly, shapes that reduce the momentum more than a combination of a surface parallel to radii from the joint, such as the first portion 12 of FIGS. 1 and 2, and a circumferential surface that is normal to radii from the joint, such as the second portion 18 of FIGS. 1 and 2, are contemplated by the present invention.

Figure 10:
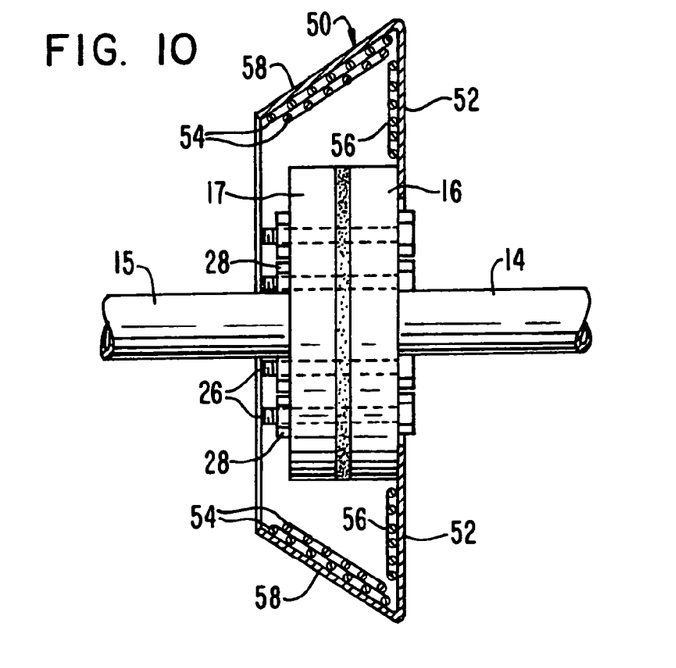
FIG. 10 is a cross section of a fifth embodiment of the fixed spray deflector according to the present invention on a pipe joint.

As can be seen from FIG. 10, surface or other features can be provided on the fixed deflector according to the present invention to enhance the reduction in the momentum of the sprays. For example, in the embodiment of FIG. 10, the deflector 50 is like the deflector 40 of FIG. 9, except that an additional structure is provided to reduce the momentum of sprays. More specifically, wire mesh 54 is provided on the underside of the second portion 58 to deflect the sprays in various directions so that various portions of the deflected sprays oppose one another and reduce the momentum of one another. In the illustrated embodiment, two layers of the wire mesh 54 are used. Of course, other numbers of layers, including a single layer, can be used. In addition, in the embodiment illustrated in FIG. 10, a layer of wire mesh 56 is secured to the first portion 52 of the deflector 50 for further spray momentum reduction. The surface or other features on the deflector 50 can take other forms that reduce the momentum of sprays. Although the wire mesh 54 and 56 has been shown only with the embodiment of FIG. 10, such wire mesh or other momentum reducing surface treatment or other features can be used on the deflectors of the other illustrated embodiments, as well as unillustrated embodiments.

It will be apparent to those skilled in the art and it is contemplated that variations and/or changes in the embodiments illustrated and described herein may be made without departure from the present invention. For example, although the embodiments of the invention specifically described and illustrated herein are disclosed in connection with joints between just two fluid conveying structures, it is understood and it is contemplated that embodiments of the present invention can be used in connection with joints of three or more fluid conveying structures. Accordingly, it is intended that the foregoing description is illustrative only, not limiting, and that the true spirit and scope of the present invention will be determined by the appended claims.

What is claimed as new and desired to be protected by Letters Patent of the United States is:

1. A spray deflecting joint of fluid conveying structures, comprising:

a joint between first and second fluid conveying structures such that a fluid being conveyed through one of the fluid conveying structures flows into the other fluid conveying structure, the fluid conveying structures being fixed from movement relative to one another at the joint; and a spray obstructing structure lying in the path of any fluid that might spray from the joint in any direction within a range of directions, wherein the spray obstructing structure is permanently attached to one of the fluid conveying structures, and the spray obstructing structure is sufficiently open to enable the fluid conveying structures to be completely removed from one another.

2. The joint of claim 1, wherein the spray obstructing structure is welded to one of the fluid conveying structures.

3. The joint of claim 1, wherein the spray obstructing structure is attached to one of the fluid conveying structures by fasteners designed not to be removed.

4. The joint of claim 3, wherein the fasteners are rivets.

5. The joint of claim 1, wherein the joint defines an interface between the fluid conveying structures, and the spray obstructing structure lies outside the interface, in alignment with the interface and across the interface.

6. The joint of claim 5, wherein the interface defines a perimeter, and the spray obstructing structure has a first portion extending from attachment to one of the fluid conveying structures to a second portion extending across the interface and having opposed edges, the first portion extending from one of the edges of the second portion to attachment to one of the fluid conveying structures, wherein the first and second portions extend around at least approximately half of the perimeter of the interface.

7. The joint of claim 5, wherein the interface defines a perimeter, and the spray obstructing structure has a first portion extending from attachment to one of the fluid conveying structures to a second portion extending across the interface and having opposed edges, the first portion extending from one of the edges of the second portion to attachment to one of the fluid conveying structures, wherein the first and second portions extend around approximately half of the perimeter of the interface.

8. The joint of claim 6, further comprising a third portion extending at an acute angle from the other of the edges of the second portion toward the axis of the fluid conveying structures.

9. The joint of claim 8, wherein the third portion extends around approximately half of the perimeter of the interface.

10. The joint of claim 6, wherein the first and second portions extend around the entire perimeter of the interface.

11. The joint of claim 6, further comprising means for directing spray back toward the axis of the fluid conveying structures.

12. The joint of claim 1, wherein each of the first and second fluid conveying structures has a flange, the flanges are connected to one another, and the spray obstructing structure is permanently attached to one of the flanges.

13. The joint of claim 5, wherein the spray obstructing structure has a shape that reduces the momentum of any said fluid more than a spray obstructing structure having a surface parallel to radii from the interface and a circumferential surface that is normal to radii from the interface.

14. The joint of claim 13, wherein the spray obstructing structure has a first surface parallel to radii from the interface and a second surface extending across the interface and lying at an acute angle to said first surface.

15. The joint of claim 6, wherein the spray obstructing structure has a shape that reduces the momentum of any said fluid more than a spray obstructing structure having said first portion parallel to radii from the interface and said second portion normal to radii from the interface.

16. The joint of claim 15, wherein said second portion lies at an acute angle to said first portion.

17. The joint of claim 1, wherein said spray obstructing structure has on a side facing the joint a momentum reducing surface treatment, wherein said surface treatment reduces the momentum of any fluid that might spray from the joint.

18. The joint of claim 17, wherein said momentum reducing surface treatment comprises wire mesh.

19. The joint of claim 6, wherein said second portion has on a side facing the joint a momentum reducing surface treatment, wherein said surface treatment reduces the momentum of any fluid that might spray from the joint.

20. The joint of claim 19, wherein said momentum reducing surface treatment comprises wire mesh.

21. The joint of claim 6, wherein said first portion has on a side facing the joint a momentum reducing surface treatment, wherein said surface treatment reduces the momentum of any fluid that might spray from the joint.

22. A spray deflecting joint of fluid conveying structures, comprising:
a joint between first and second fluid conveying structures such that a fluid being conveyed through one of the fluid conveying structures flows into the other fluid conveying structure, the fluid conveying structures being fixed from movement relative to one another at the joint; and
a spray obstructing structure lying in the path of any fluid that might spray from the joint in any direction within a range of directions, wherein the spray obstructing structure is attached to one of the fluid conveying structures, and wherein the spray obstructing structure has a shape that reduces the momentum of any said fluid more than a spray obstructing structure having a surface parallel to radii from the interface and a circumferential surface that is normal to radii from the interface, and wherein the spray obstructing structure is sufficiently open to enable the fluid conveying structures to be completely removed from one another.

23. The joint of claim 22, wherein the spray obstructing structure has a first surface parallel to radii from the interface and a second surface extending across the interface and lying at an acute angle to said first surface.

24. The joint of claim 22, wherein the joint defines an interface between the fluid conveying structures, the spray obstructing structure lies outside the interface, in alignment with the interface and across the interface, the interface defines a perimeter, the spray obstructing structure has a first portion extending from attachment to one of the fluid conveying structures to a second portion extending across the interface and having opposed edges, the first portion extends from one of the edges of the second portion to attachment to one of the fluid conveying structures, the first and second portions extend around at least approximately half of the perimeter of the interface, and said second portion lies at an acute angle to said first portion.

25. A spray deflecting joint of fluid conveying structures, comprising:
a joint between first and second fluid conveying structures such that a fluid being conveyed through one of the fluid conveying structures flows into the other fluid conveying structure; and
a spray obstructing structure lying in the path of any fluid that might spray from the joint in any direction within a range of directions,
wherein the spray obstructing structure is attached to one of the fluid conveying structures, the spray obstructing structure is sufficiently open to enable the fluid conveying structures to be completely removed from one another when the spray obstructing structure is attached to one of the fluid conveying structures, said spray obstructing structure has on a side facing the joint a momentum reducing surface treatment, and said surface treatment reduces the momentum of any fluid that might spray from the joint.

26. The joint of claim 25, wherein said momentum reducing surface treatment comprises wire mesh.

27. The joint of claim 25, wherein the joint defines an interface between the fluid conveying structures, the spray obstructing structure lies outside the interface, in alignment with the interface and across the interface, the interface defines a perimeter, the spray obstructing structure has a first portion extending from attachment to one of the fluid conveying structures to a second portion extending across the interface and having opposed edges, the first portion extends from one of the edges of the second portion to attachment to one of the fluid conveying structures, the first and second portions extend around at least approximately half of the perimeter of the interface, and said second portion has said momentum reducing surface treatment on a side facing the joint, wherein said surface treatment reduces the momentum of any fluid that might spray from the joint.

28. The joint of claim 27, wherein said momentum reducing surface treatment comprises wire mesh.

29. The joint of claim 27, wherein said first portion has on a side facing the joint a momentum reducing surface treatment, wherein said surface treatment reduces the momentum of any fluid that might spray from the joint.

* * * * *